Aug. 2, 1966 A. W. HODGSON 3,264,431

COMPACT SWITCHING APPARATUS EMPLOYING FUSE AS MOVABLE CONTACT

Filed Nov 7, 1962 8 Sheets-Sheet 1

Aug. 2, 1966 A. W. HODGSON 3,264,431

COMPACT SWITCHING APPARATUS EMPLOYING FUSE AS MOVABLE CONTACT

Filed Nov 7, 1962 8 Sheets-Sheet 2

WITNESSES

Edwin E. Bassler

James F. Young

INVENTOR

Alfred W. Hodgson

BY

Clement J. Paznokas

ATTORNEY

Aug. 2, 1966

A. W. HODGSON 3,264,431

COMPACT SWITCHING APPARATUS EMPLOYING
FUSE AS MOVABLE CONTACT

Filed Nov 7, 1962

8 Sheets-Sheet 3

Aug. 2, 1966 A. W. HODGSON 3,264,431

COMPACT SWITCHING APPARATUS EMPLOYING FUSE AS MOVABLE CONTACT

Filed Nov 7, 1962 8 Sheets-Sheet 8

United States Patent Office 3,264,431
Patented August 2, 1966

3,264,431
COMPACT SWITCHING APPARATUS EMPLOYING FUSE AS MOVABLE CONTACT

Alfred W. Hodgson, Orchard Park, N.Y., assignor to Westinghouse Electric Corporation, Pittsburgh, Pa., a corporation of Pennsylvania Filed Nov. 7, 1962, Ser. No. 235,938
22 Claims. (Cl. 200—114)

This invention relates to switching apparatus and more particularly to line starters of the type having in series in the power circuit, a disconnect or isolating switch, a fuse, and the main or power contacts of a contactor.

An important object of this invention is to achieve reduction in size, weight and materials of switching apparatus. Aside from manufacturing and space and weight economies, reduced mechanical size is conducive to less maintenance and to longer life of operating parts such as the contactor, etc. Safety of mechanical interlocks is improved with small levers and other movable lock elements having more positive action than larger parts. With smaller components and structure, maintenance is easier in spite of a smaller enclosure. Thus an over-all object of the invention is switching apparatus having, for a particular power capacity, minimum dimensions, weight, and manufacturing costs, but at the same time providing increased safety, reliability, long life and ease of maintenance.

In accordance with one embodiment of the invention, the above objects are achieved by a novel over-all and detailed structural arrangement wherein a current transformer, contactor, power fuse, and disconnect, structurally "flow" into each other to provide a compact integral unit. The arrangement includes not only novel component structure but also novel relative placement of components. In this embodiment, the blowout coil is forward of and connected to the movable contact of the contactor. The power fuse is mounted vertically with its lower end rockably mounted on a common support which also carries the fixed contact of the contactor, the upper end terminal of the fuse being linked to a horizontally movable carrier, which when moved, moves the upper end of the fuse in an arcuate path. At one end of the excursion, the upper end of the fuse engages a fixed main line contact. Reverse movement of the carrier disengages the upper end of the fuse from the line contact. Thus the upper end of the fuse forms the disconnect or isolating switch.

The specific disconnect operating arrangement and the safety features disclosed herein in connection with the general description, such as the mechanical interlocks and shutter, are described and claimed in the U.S. patent application Serial No. 235,940, filed concurrently herewith and assigned to the same assignee. Features of the fuse clip at the swinging end of the fuse disclosed herein are claimed in U.S. patent application Serial No. 399,119 (a division of Serial No. 235,940). Details of one form of rockable fuse mount for the lower end of the fuse described herein, are also described and claimed in the U.S. patent application, Serial No. 235,939, filed concurrently herewith by Russell D. Clark and Alfred W. Hodgson, and assigned to the same assignee.

Other and further objects and advantages will become apparent from the following description taken in conjunction with the drawings, wherein a preferred embodiment of the invention is illustrated.

In the drawings:

FIG. 3 shows the apparatus in the OFF position while FIG. 4 shows the apparatus in the ON position;

Figures 12, 13:
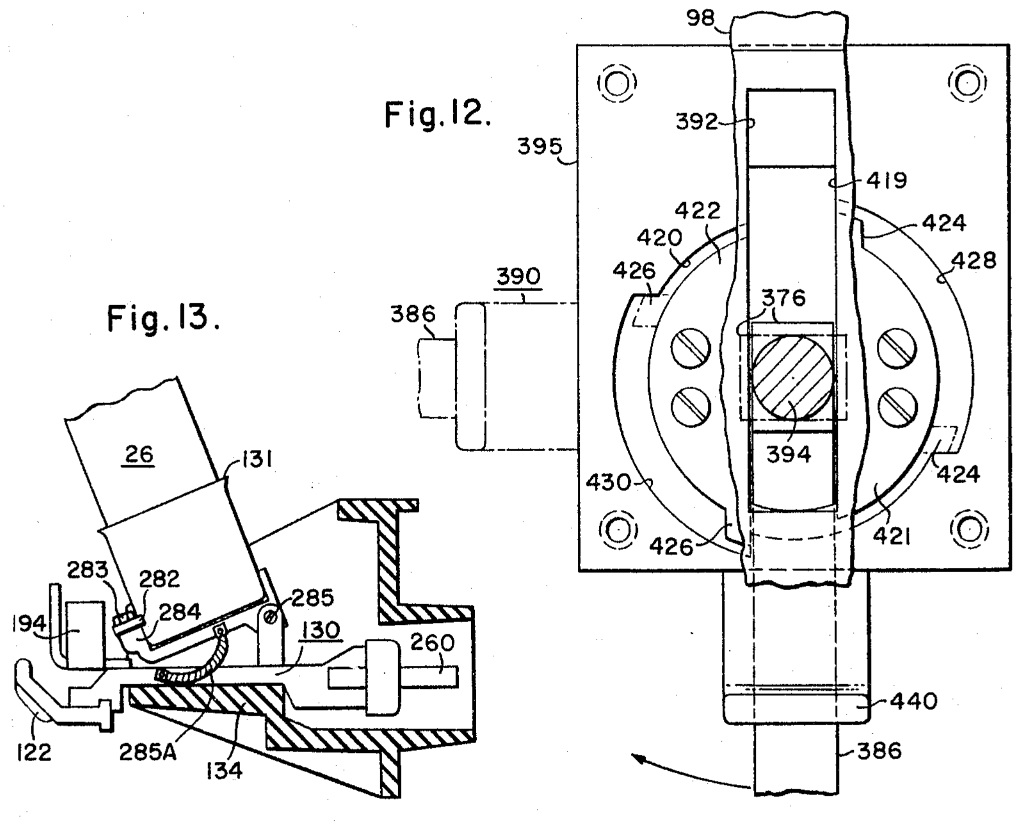
Figure 2:
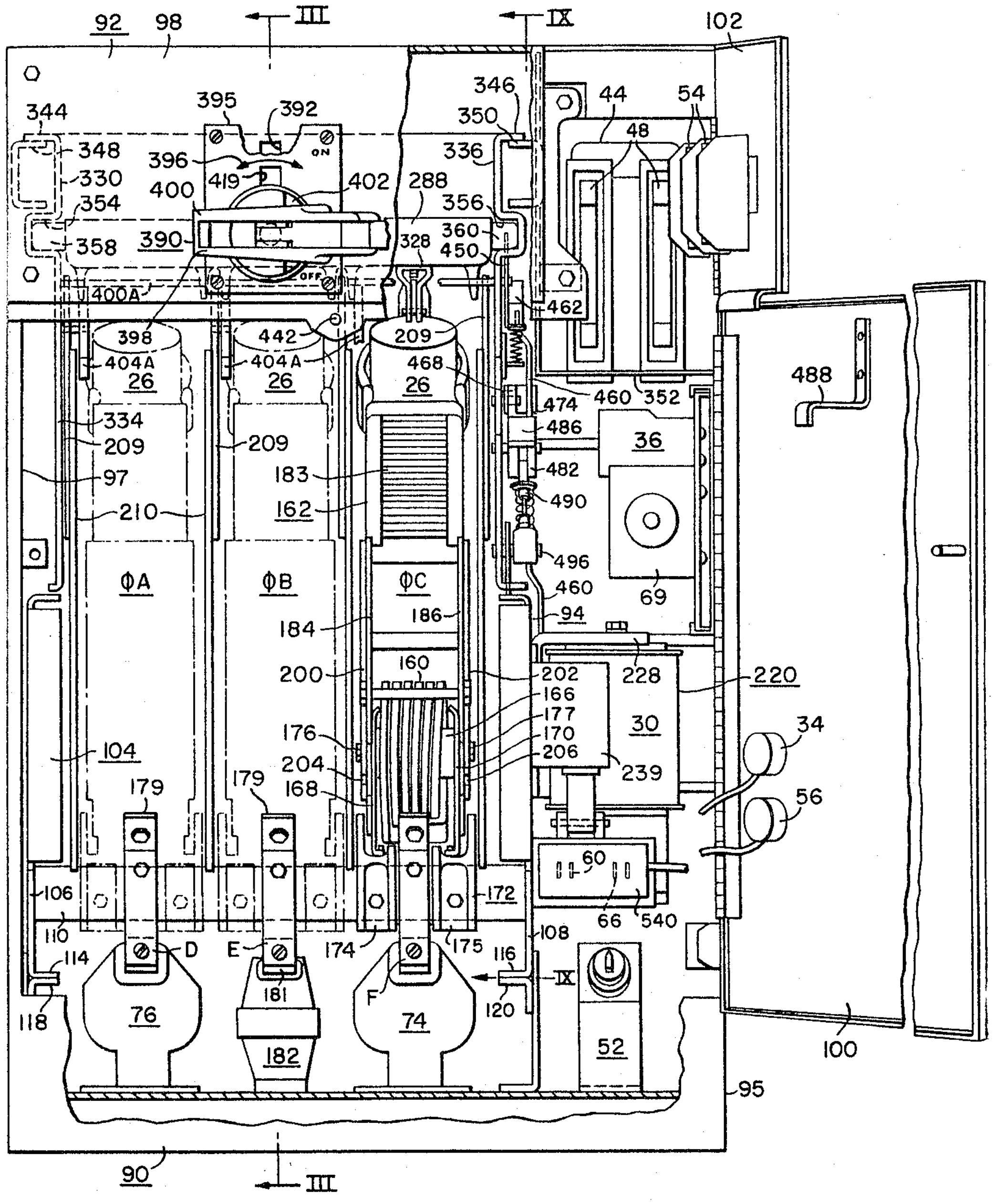
FIGURE 2 is a front view with parts broken away of switching apparatus incorporating features of the invention.
Figure 9:
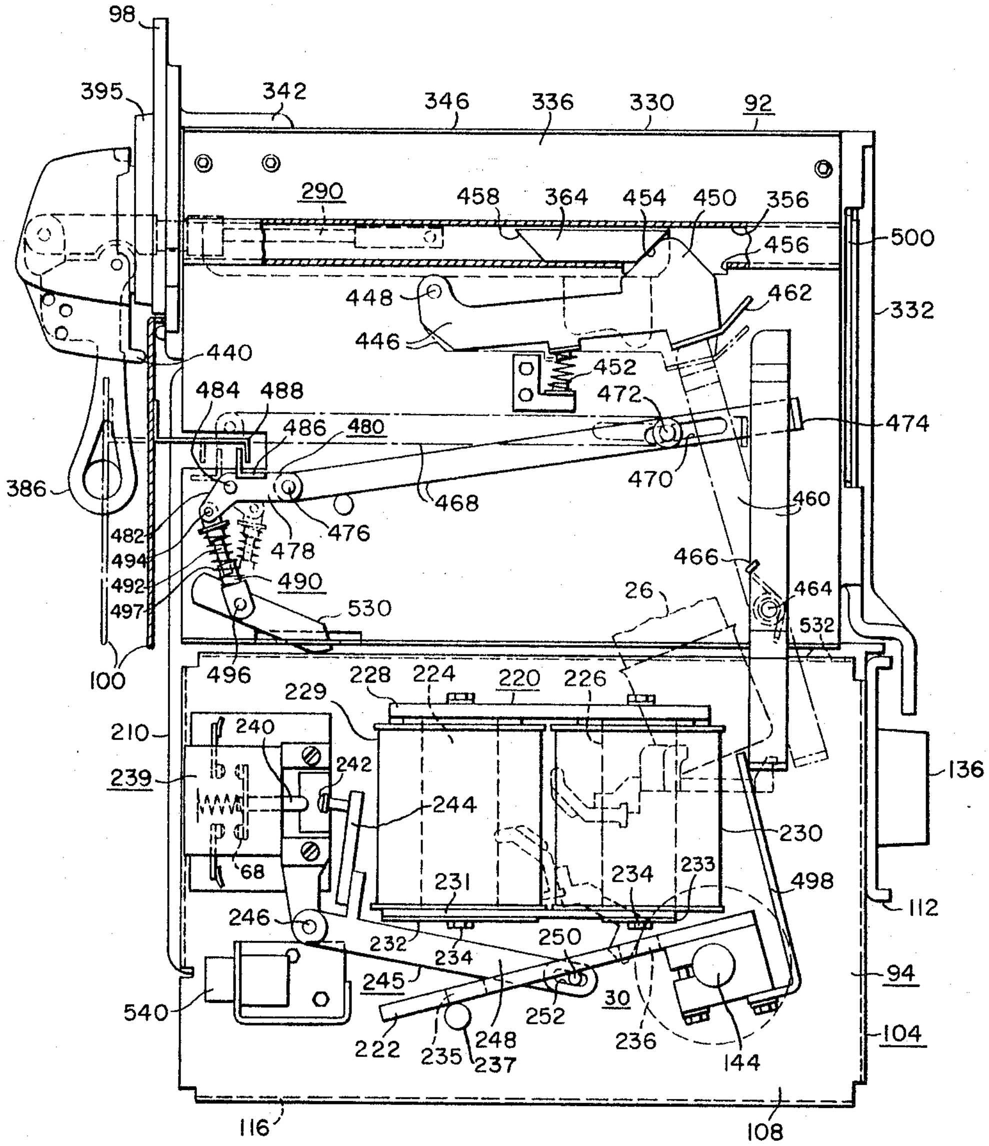
Figure 10:
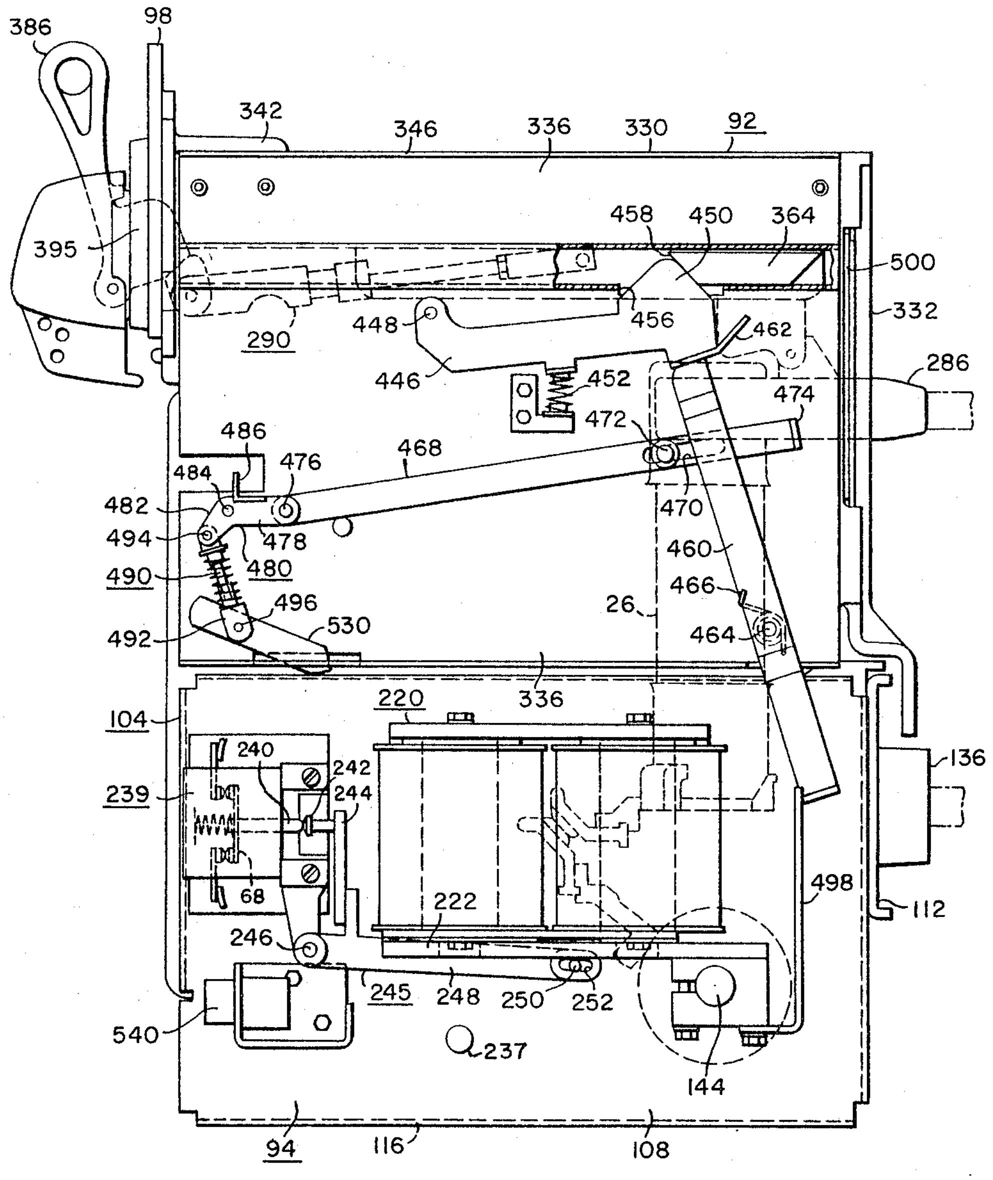
Figure 11:
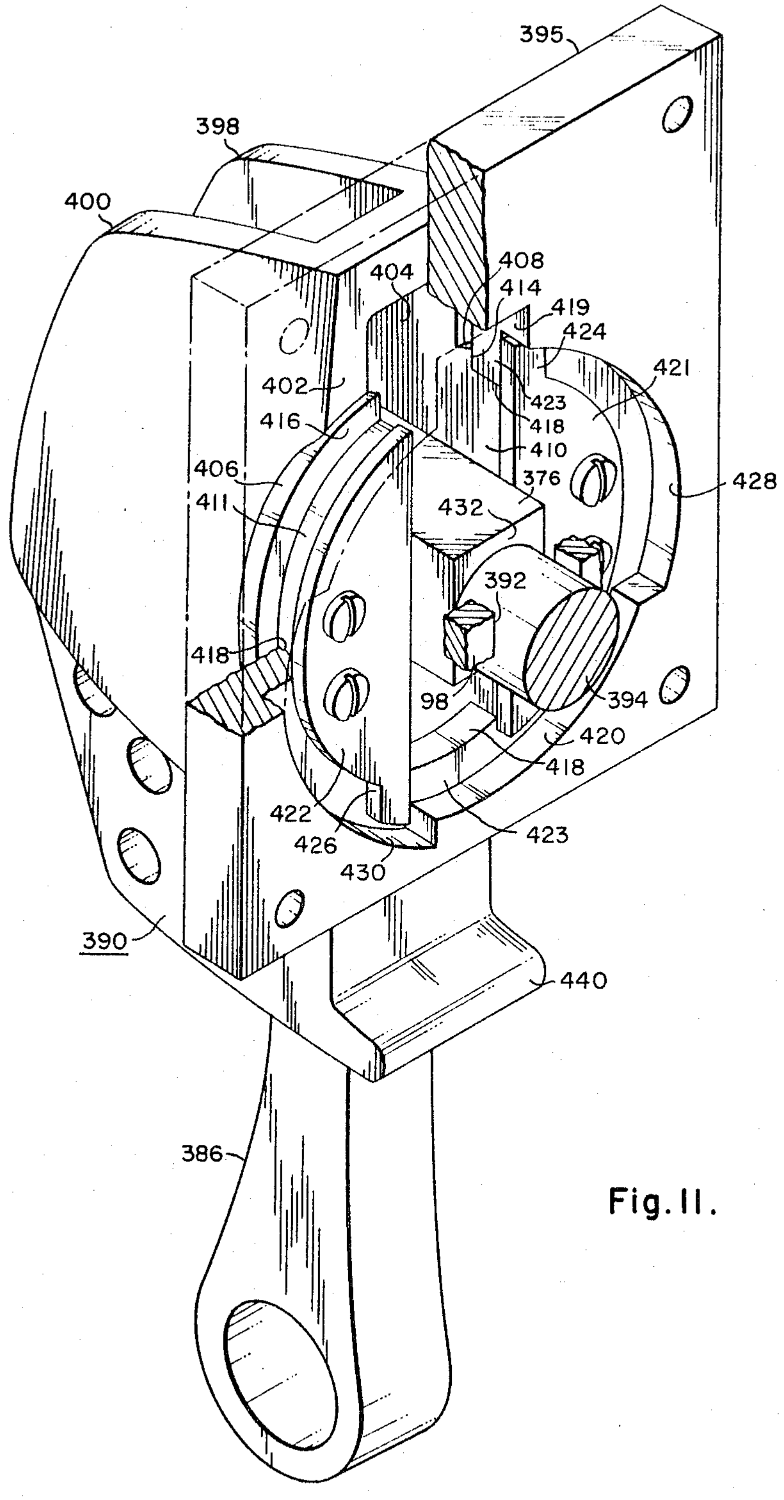

FIGS. 9 and 10 are views taken generally along the line IX—IX of FIGURE 2 showing the right sides of the disconnect and contactor units, and illustrating details of safety interlocks in various positions. In FIG. 9 the apparatus is shown in the OFF position, while in FIG. 10 the apparatus is shown in the ON position. Although these views show the disconnect and contactor units as they are related in the cabinet, the cabinet itself is not shown in FIGS. 9 and 10, except for a fragment of the cabinet door seen in FIG. 9;

FIGS. 11 and 12 are views illustrating details of the operating handle, handle housing, and bearing plate arrangement, both views "looking" at the backside of the bearing plate; and FIG. 13 is a view illustrating an alternative arrangement for pivotably mounting the lower end of the fuse.

*Circuit*

Figure 1:
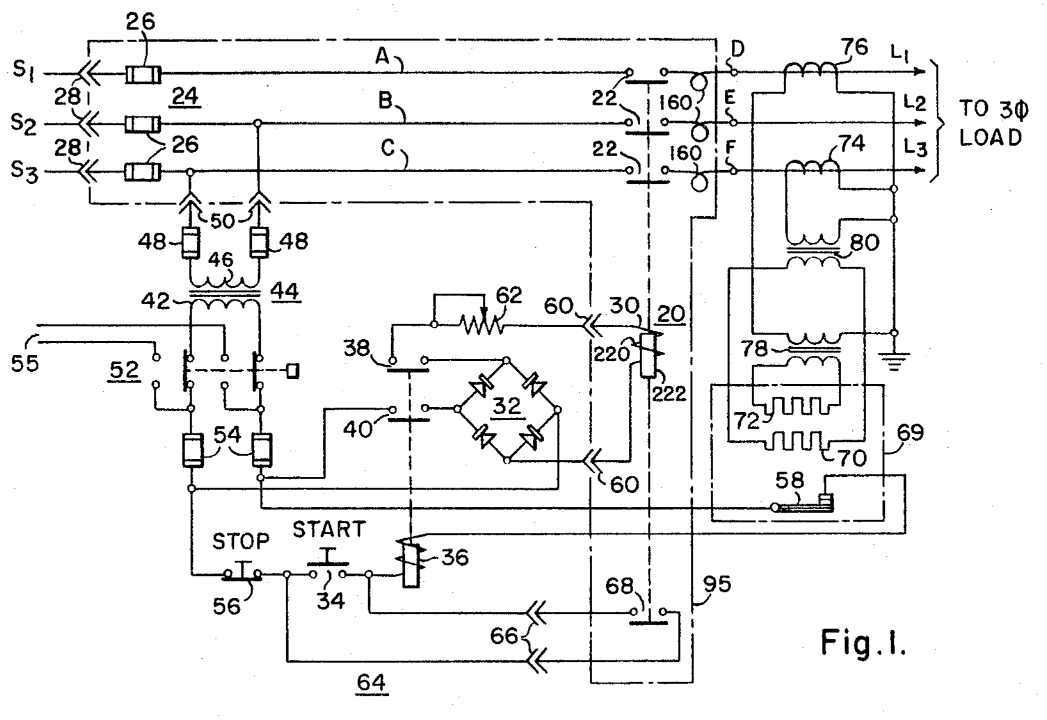
FIGURE 1 is a schematic diagram of an example of a circuit for switching apparatus built in accordance with one embodiment of the invention and described herein.

Included in the diaphragm of FIG. 1 is a power-operated main contactor 20 with power contacts 22 to connect three-phase load lines L1, L2 and L3 to conductors A, B and C, which are normally connected to main supply lines S1, S2 and S3, through a disconnect or isolating switch 24 formed in accordance with the invention by a unique arrangement of main fuses 26 and sets of complementary disconnect contacts 28.

Contactor 20 includes an electromagnetic operator 30, which is energized by a rectifier 32 in response to the operation of a normally biased open push button start switch 34. Closure of the start switch energizes a relay 36 whose normally open contacts 38 and 40 respectively connect the output of rectifier 32 to the operator 30 and the input of the rectifier to the secondary 42 of a step-down transformer 44, whose primary 46 is connetced across one phase of the main power lines. The input to primary 46 includes fuses 48 and stab type disconnects 50. The electromagnetic operator of relay 36 is energized from the transformer secondary 42 through a circuit which includes a double pole, double throw switch 52, normally in the position shown, fuses 54, a normally closed stop switch 56, and a normally closed thermostatic switch 58. Included in the output circuit of rectifier 32 are the normally open contacts 38, male-female type plug disconnects 60, and an adjustable resistor 62 which may be adjusted when needed to compensate for aging of the rectifier cells in rectifier 32. A hold or latch circuit 64 is shunted across the start button 34 and includes male-female plug type disconnects 66 and normally open contacts 68, which are operated to close the circuit across the start button when contactor 20 is operated, thereby holding relay 36 and consequently contactor 20 in the operated condition.

The thermostatic switch 58 is an overload switch and responds to overload of the load lines as manifested in the heating of resistors 70 and 72, energized respectively from current transformers 74 and 76 through intermediate transformers 78 and 80. Current transformers 74 and 76 are coupled to the load lines.

*Cabinet and general disposition of components therein*

Figure 3:
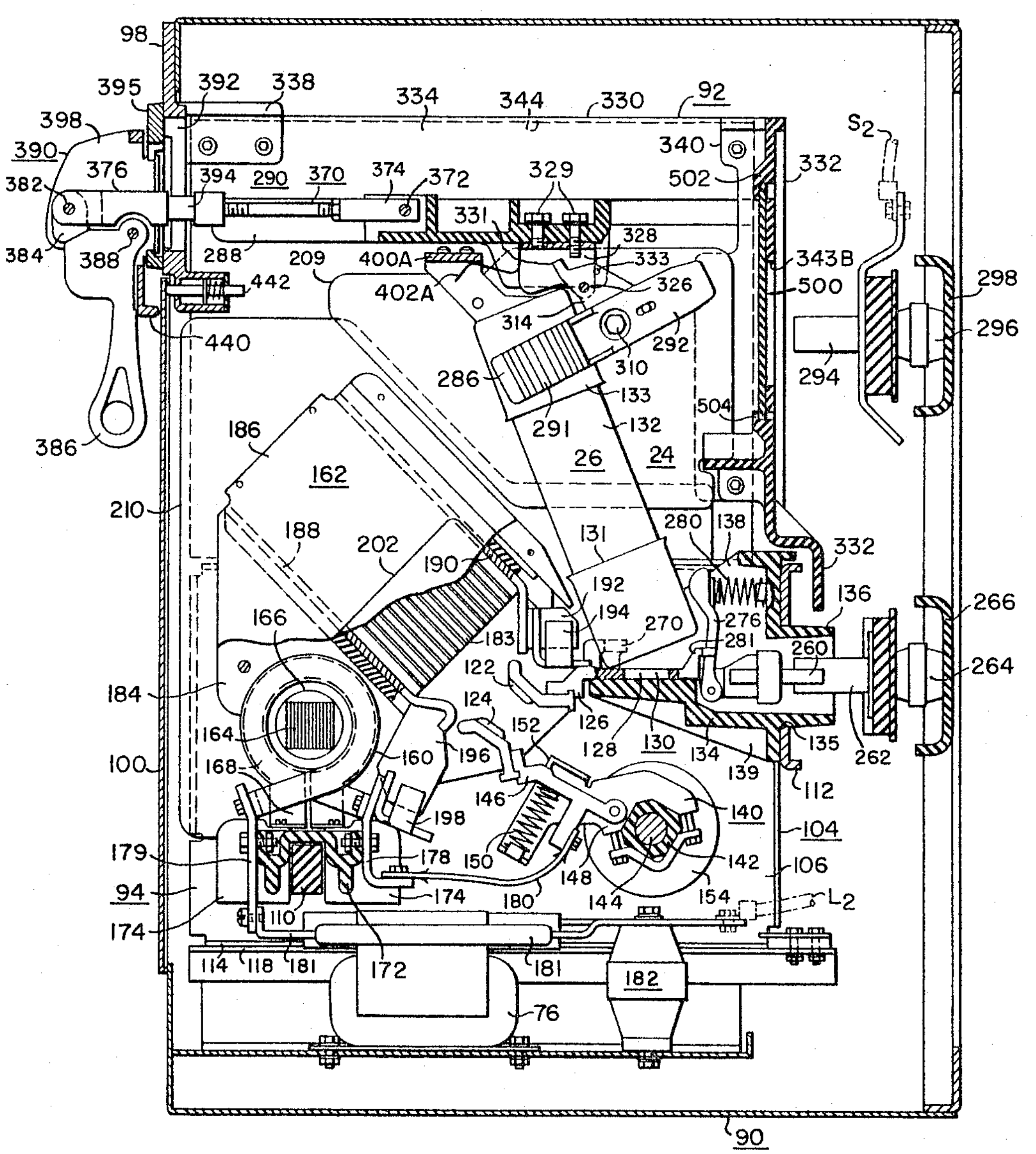
FIGS. 3 and 4 are sectional views taken generally along the line III—III of FIGURE 2, with some parts shown in full.
Figure 4:
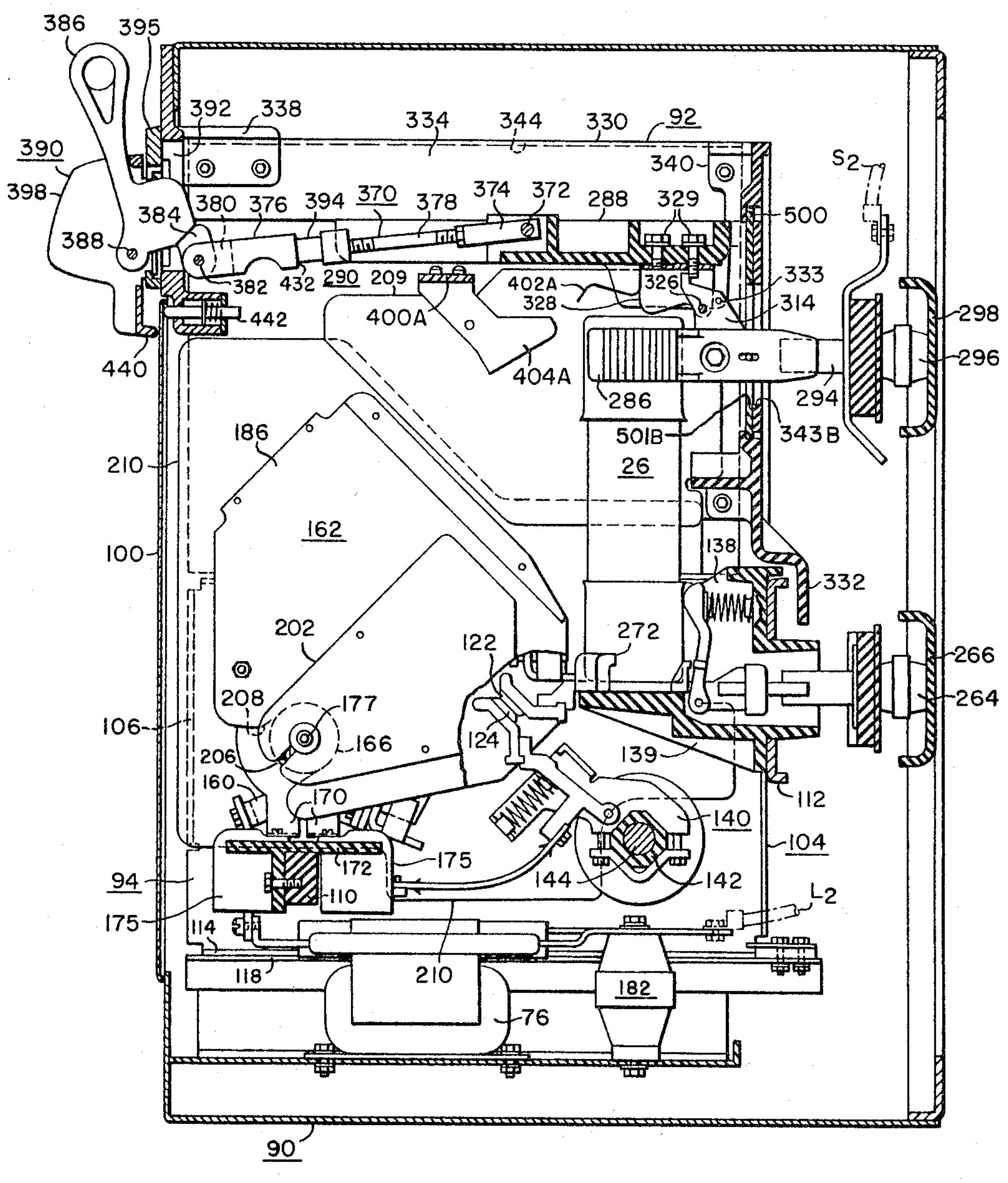

The apparatus components of FIGURE 1 are distributed in various areas of an interior space defined by exterior structure for example a cabinet indicated generally at 90 in FIGURES 2, 3 and 4.

Located one above the other on the left side and central portions of the cabinet 90 (FIG. 2) are an isolating switch unit 92 and a main contactor unit 94, each being slidably removable from the cabinet. The isolating switch 24 and its operator are included in the unit 92 while the main contactor 20 is included in the unit 94. The power fuses 26 are supported by both units 92 and 94. Thus the main power components are located in units 92 and 94. Thus, the main power components lying within the dashed line enclosure 95 (FIG. 1) are located in units 92 and 94 (FIG. 2).

The apparatus within the dashed line enclosure comprising the contactor 20, the isolating switch 24, and the power fuses 26, may be designated the main power apparatus, while that outside the dashed line enclosure may be referred to as the auxiliary equipment.

Referring again to FIG. 2, it is seen that the current transformers 74 and 76 are located in the lower section of the cabinet 90 below the contactor unit 94, while most of the rest of the auxiliary equipment is located in the space on the right side of cabinet 90 formed between the right wall 95 of the cabinet 90 and units 92 and 94. Most of the wiring between the components is not shown in FIG. 2.

Although the back of cabinet 90 is shown generally open to provide convenient access for connections to main power and load lines, it will be appreciated that either the top or the bottom of the cabinet may be apertured instead of the back for the receipt of supply and load lines. Cabinet 90 is provided with a frontal opening 97 through which units 92 and 94 are accessible and removable. When the isolating switch unit 92 is properly located in the cabinet, a portion of opening 97 is covered by a front panel 98 attached to and forming a part of unit 92. The rest of the opening 97 is coverable by a main door 100 and an auxiliary door 102, both hinged to the right wall 95 of cabinet 90.

*Main contactor unit*

The main contactor unit 94 is provided with a frame 104 formed from side walls 106 and 108 held in rigid speced relation by cross pieces 110 and 112 whose ends are secured to the side walls of the frame. In a particular example, the cross piece 110 was made of strong insulating material to improve the voltage rating of the apparatus. While the side walls and the front cross piece 110 of this frame are visible in FIG. 2, the back cross piece 112 is visible only in FIGS. 3, 4, 9 and 10. The cross piece 110 is also visible in section in FIGS. 3 and 4. One or the other of the side walls may be seen in each of FIGS. 3, 4, 9 and 10.

At their lower edges, walls 106 and 108 are provided with inturned flanges 114 and 116 for seating on and slidably engaging a pair of rails 118 and 120 secured to the cabinet floor and extending from front to back.

Since a three-phase example is shown, contacts 22 comprise three sets of relatively movable, mutually engageable, complementary main contacts, one set per phase line. Thus the contactor has three sets of main contacts and attendant blowout coils and arc chutes. In FIG. 2, details for only one set, $\phi C$, are shown, while in FIGS. 3 and 4, the set shown in detail is that of $\phi B$. However, all sets are the same, being duplicates of one another.

Each set of contacts 22 includes a fixed contact 122 (FIGS. 3 and 4) and a movable contact 124. Contact 122 is secured to a conductive bracket 126 which extends from and is an integral part of the conductive base 128 of a fuse mount 130 for rockably supporting the lower ferrule or contact end 131 of a main power fuse 26. By way of example, the fuse shown is an elongated tubular type having an insulating casing 132 and end contacts such as ferrule type terminals 131 and 133 coupled to the opposite ends of the fuse, the end contacts 131 and 133 being connected to an internal fusible element. The fuse mount 130 is carried by an insulating support 134 fixed to the back cross bar 112 which is provided with an aperture 135 for the passage therethrough of a bushing portion 136 of the insulating support 134. The insulating support 134 has upper and lower side walls 138 and 139 to provide insulative shielding between phases.

Movable contact 124 is carried by an assembly 140 clamped with an intervening insulating sleeve 142 to a contactor operating shaft 144 for rotation therewith. More specifically, contact 124 is secured to a spring-loaded arm 146 pivoted to a member 148 that is clamped to rotate with shaft 144. A bias spring 150 urges the arm 146 forward to seat the contacts when they are operated (closed). When the contacts are in an unoperated position (open) the arm 146 is stopped by an abutment 152 on member 148. The spring loading and pivoting of arm 146 provides a rolling contact force when the contactor shaft 144 is rotated to close the contacts. The insulation 142 is part of insulative molding around the shaft 144, which molded insulation includes annular flanges 154 on opposite sides of member 148 to provide insulation between phases.

Each phase section of the contactor is provided with a blowout coil 160 and associated arc chute 162. The blowout coil is located forward of both the fuse 26 and the set of main contacts 22, while the arc chute is located between the blowout coil and the fuse. This provides an extremely compact arrangement which permits convenient access and allows the arc chute "outlet" to be angled outward to steer the arc and gases away from sensitive areas. Compactness is served by the generally L-shaped pattern in which the fuse 26, the contactor contacts 122–124 and the blowout coil 160 are arranged. The fuse is along the leg of the L, the blowout coil at the toe of the L, and the set of contacts is along the foot of the L and back of the toe. In FIGS. 3 and 4, the L-pattern appears in reverse.

The blowout coil 160 encircles a laminated iron core 164 from which it is insulated by an insulating sleeve 166 which supports the core (FIG. 3). The sleeve 166 is supported at opposite ends by brackets 168 and 170 secured to an irregularly shaped insulating member 172 which is carried by and straddles the cross bar 110. The ends of the sleeve 166 are shouldered and snugly pass through apertures in the upper ends of brackets 168 and 170 so that the ends of the sleeve extend beyond the brackets to provide a bearing surface for side plates of the arc chute. Insulating member 172 has flanges 174 and 175 on opposite sides of the blowout coil mounting to provide insulation between phases. A pair of arc chute retaining bolts 176 and 177 are threaded into opposite ends of the core 164.

The ends of the blowout coil 160 are bolted to heavy conductive terminals 178 and 179 secured to opposite sides of the insulating member 172. A flexible conductive strap 180 connects the terminal 178 to the movable contact arm 146. Since it is phase B which is shown in detail in FIGS. 3 and 4, terminal 179 is connected to load line L2 through a conductive strap 181 supported by an insulator 182 secured to the cabinet 90. It should be noted that in phases A and C, the respective terminals 179 are connected to the strap primaries of transformers 76 and 74, the other ends of these primary windings being connected to load lines L1 and L3, respectively. In FIGS. 1 and 2 the terminals 179 of the respective phases are represented by D, E and F. It should be noted that the connections at terminals D, E and F are made only after the contactor unit 94 has been inserted in the cabinet 90.

The arc chute 162 is of the spaced plate type having a group of parallel spaced insulator plates 183 bounded by insulating side walls 184 and 186. At opposite ends of the stack of plates 183 there are provided a pair of conductive arc horns 188 and 190. The lower end of arc horn 190 has attached thereto a conductive blade 192 which is received and frictionally gripped by a conductive spring clip 194 attached to bracket 126. Likewise, the lower end of arc horn 188 is provided with a conductive blade 196 which is received and frictionally gripped by a conductive spring clip 198 attached to terminal 178. Arc horns 188, 190, their respective blades 192 and 196, and clips 194 and 198, are made of conductive material for circuit continuity.

On opposite sides thereof, the arc chute 162 is provided with ferromagnetic pole pieces 200 and 202 secured to the side plates 184 and 186, respectively. The pole pieces 200 and 202 are provided with slots 204 and 206 in which bolts 176 and 177 are received to provide a pivotal mounting for the arc chute 162 and easy removal of the arc chute along the slot when the arc chute is tilted to the left, FIGS. 3 and 4, so that the arc chute may be removed through the frontal opening of the cabinet. The arc chute may be tilted to the left to permit inspection of the contacts or for removal of the arc chute as desired. When the arc chute is tilted to the left the arc horn stabs 192 and 196 disengage from clips 194 and 198. The side walls 184 and 186 of the arc chute 162 are cut out at 208 to fit around and "ride" on the insulating tube 166. Extra insulation around phases is provided by fixed insulating barrier plates 209 and readily removable insulating barrier plates 210 that are slidable in and out of place. Plates 209 are hung from members 404A attached to a cross-bar 400A that is fixed within the isolating switch unit 92.

The arc chute is mounted at an angle of approximately 45° to provide space for the power fuse to pivot as required during operation of the isolating switch and also to direct hot exhaust gases from the arc chute up and forward toward the enclosure door away from energized components.

From the aforesaid description of the structural details and position of the arc chute it is seen that the arc chute is pivoted about the blowout core center line through the use of a floating blowout core mounting arrangement, to permit removal of power fuses and for inspection of contactor contacts and internal parts of the arc chute. The arc chute is proportioned and pivoted in a manner such that no additional clearance is required within the starter for swinging the arc chute open. Since the arc chute swings out of the open cabinet door, the necessity for additional clearance space within the cabinet for arc chute opening or removal is eliminated, the arc chute is more accessible for inspection, and the operator cannot close the enclosure door and energize the starter with the arc chute open. It is further apparent that the arc chute is supported by its blowout pole pieces which in turn are bolted to the blowout core by means of the open end slotted holes, as heretofore described, so that the arc chute may be removed simply by loosening the blowout core bolts rather than by removing these bolts completely.

It will be noted that the connector 178, the flexible strap 180, and the movable contact and contactor arm 146 form a reverse current loop which in response to power current through the contacts provides magnetic forces that react to help hold the contacts closed.

Contact 124 is driven into engagement with contact 122 by rotation of shaft 144 which is journalled in the side walls 106 and 108 of the contactor assembly frame 104 and is driven by the electromagnetic actuator 30. The latter comprises an electromagnet 220 and an armature 222 clamped to contactor shaft 144 (FIGS. 9 and 10), and aligned to be attracted by the electromagnet 220 when the latter is energized by rectifier 32. The electromagnet 220 includes ferromagnetic cores 224 and 226 connected by a magnetic yoke 228, around which cores are wound coils 229 and 230. Yoke 228 is L-shaped and also functions as a bracket, being secured to the side wall 108 of the contactor frame 104 (FIG. 2). The ends of poles 224 and 226 are overlaid by a non-magnetic shim 231 held in place by ferromagnetic pole faces 232 and 233 clamped by bolts 234 screwed into the cores. The shim 231 provides an effective air gap to reduce armature sticking. Clearance for the heads of bolts 234 is provided by apertures 235 and 236 formed in the armature 222. In FIG. 9, the electromagnetic actuator 30 is shown deenergized, in which position the contactor 20 is unoperated and its contacts are open. When the electromagnet 220 is energized, the armature 222 is drawn upward as in FIG. 10, thus rotating shaft 144 to force contact 124 into engagement with the fixed contact 122. This is the "operated" position of the contactor. When the electromagnet 220 is deenergized, the main contacts 22 are opened by the force of contact spring 150 and the force of gravity on the armature 222.

In addition to operating the main contacts to a closed position, the electromagnetic actuator 30 also when energized, closes the normally open contacts 68. Normally open switch contacts 68 are shown in FIGS. 9 and 10 in the form of a plunger switch 239 having a spring-biased operating plunger 240. This plunger is driven from its open (FIG. 9) to its closed (FIG. 10) position by a boss 242 attached to one arm 244 of a bell-crank lever 245 movable around a pivot 246 fixed relative to the side plate 108, and having another arm 248 driven from open to closed positions by the armature 222 of the electromagnetic actuator 30. Coupling between armature 222 and the bell crank arm 248 is effected by a lateral pin 250 fixed to the armature and having one end disposed in and engaging the walls of a slot 252 formed in the end of the bell crank arm 248. Thus it is apparent that normally open contacts 68 are closed in response to the operation of contactor 20.

It will be seen in FIGS. 3 and 4 that the fuse mount 130, which pivotably supports the power fuse 26, has conductively attached thereto and integral therewith a contact clip 260 which extends through bushing 136 and engages a stab contact 262 when the contactor unit 94 is disposed in operative position in the cabinet. Stab 262 is mounted on an insulator 264 carried by an insulator cross bar 266 secured to opposite sides of the back end of cabinet 90. Clip 260 and stab 262 constitute the disconnect set 50 connected to phase B, stab 262 being connected through a fuse 48 to the primary 46 of transformer 44. It will be appreciated that a similar stab 262 associated with the fuse mount 130 in phase C is connected to the other end of the transformer primary 46 through a fuse 48.

Figures 6, 7, 8:
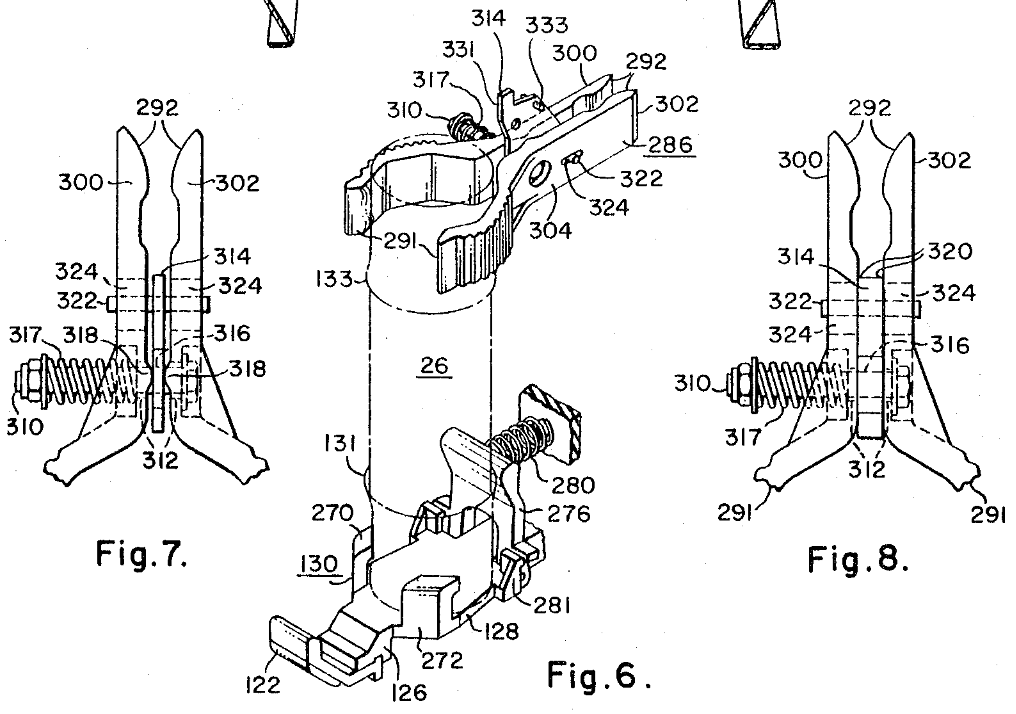
FIG. 6 illustrates details of upper and lower fuse clips included in the apparatus of FIG. 3.
FIG. 7 shows a detail of the upper fuse clip in FIG. 6.
FIG. 8 illustrates an alternative form of the detail in FIG. 7.

Fuse receptacle 130 is provided with a pair of spaced front contact fingers 270 and 272 extending upwardly from the base 128 to frictionally and conductively engage the contact ferrule 131 of fuse 26 (FIGS. 3, 4 and 6). The fuse receptacle 130 is further provided with a rearward upstanding gripping finger 276 pivoted at its lower end to the base 128 and forwardly biased by a spring 280.

As seen in FIG. 4, when the power fuse 26 is in a vertical position, the lower contact ferrule 131 is engaged and forwardly urged by finger 276 into forced tight engagement with contact fingers 270 and 272, thus holding the lower fuse ferrule in the grip of the three fingers. On the other hand, when the upper end of fuse 26 is forwardly tilted (leftward in FIG. 3), a stop 281 is engaged by finger 276, thereby limiting its forward movement and disengaging it from the lower ferrule 131 of the fuse. In this position, the lower end of fuse 26 is loosely "cupped"

by the fuse receptacle 130, thus permitting easy removal and replacement.

*Isolating switch unit*

The upper ferrule 133 of fuse 26 is held in a conductive fuse clip 286 pivotally suspended from a carrier 288, made of insulating material, which is slidably mounted in the isolating switch unit 92 for backward and forward movement in response to an operating linkage 290 (FIGS. 3 and 4). In addition to fuse jaws 291, the clip 286 is provided with posterior stab jaws 292 for conductively engaging a fixed contact in the form of main line stab 294 mounted on an insulator arrangement 296 carried by cross member 298 secured between the side walls of cabinet 90. In the example shown the clip 286 is a contact directly engaging the fixed contact 294. However, since the clip 286 is an extension of the upper end contact 133 of the fuse, the upper end of the fuse is in electrical contact with the line stab 294 when clip 286 is in contact with line stab 294. Being in phase B, the line stab 294 in FIG. 3 is connected to supply line S2.

As shown in FIGS. 6 and 7, clip 286 comprises two similarly shaped complementary members 300 and 302, each having an intermediate shank portion 304 and the fuse jaw and stab jaw end portions 291 and 292, respectively. At their shank portions 304, members 300 and 302 (FIGS. 7 and 6) are pivotally coupled together and to a pivot plate 314 by means of a spring loaded bolt 310 passing through oversize apertures 312 formed in members 300 and 302 and an aperture 316 formed in bracket 314. A spring 317 resiliently biases members 300 and 302 toward each other. At their inner faces, members 300 and 302 are provided with protuberances 318 about which members 300 and 302 can rock with the pivot plate 314 providing the fulcrum. A pin 322 affixed to and extending from opposite sides of bracket 314 extends through and engages the walls of slots 324 formed in the intermediate portions of members 300 and 302, thereby maintaining the members in alignment with each other and with the bracket 314.

In the position shown in FIG. 3, the stab jaws 292 are not in engagement with the stab 294 and the upper fuse ferrule 133 is held in the fuse jaws 291 under light pressure. However, in the position shown in FIG. 4, the stab jaws of the clip 286 are in engagement with the stab 294, which acts as a wedge to drive the stab jaws 292 apart and compress the spring 317, thereby increasing the compressive force of the fuse jaws 291 to tightly clamp the upper ferrule of the fuse. This compression of the spring increases the contact force on both the stab 294 and the upper ferrule of the fuse. When the clip is withdrawn from the stab 294 as in FIG. 3, the elements 300 and 302 are permitted to touch the pivot plate 314. In this position the spring force is much reduced, allowing easy removal of the fuse.

Pivot plate 314 is suspended on a pivot 326 (FIG. 3) carried by a bracket 328 attached with bolts 329 to the carrier 288, whereby the clip 286 is moved forward and backward together with the carrier 288. Plate 314 has a tab 331 and a pin 333 to provide opposite travel limits for clip 286 about pivot 326. From the above description it will be appreciated that the carrier 288 is flexibly coupled to the fuse 26 by means of the pivot plate 314, which with pivot 326 provides a flexible or articulated joint between the carrier 288 and the fuse 26.

Alternatively, as shown in FIG. 8, the protuberances 318 may be eliminated, and the pivot plate 314 thickened along its extent between the members 300 and 302 to provide sufficient rocking clearance, thus to allow the elements 300 and 302 to be rocked around the pivot plate as a fulcrum. In this arrangement the pivot plate provides a fulcrum at its rearward edges 320 around which the members 300 and 302 rock when the fuse jaws are forced apart.

As seen in FIGS. 2, 3 and 9, the isolating unit 92 is provided with a frame 330 comprising the front panel 98, a back panel 332 made of insulating material, and side plates 334 and 336 rigidly secured together in the form of an open rectangle as viewed from the top. More specifically, the side plates are secured to angular extensions of the front and back panels extending from and normal to the front and back panels. For example, the side panel 334 is bolted to angular extensions 338 and 340 extending from the front and back panels respectively (FIG. 3). As seen in FIG. 9, the side plate 336 is secured to an extension 342 of the front panel 98. The extension from the back panel to which the side plate 336 is secured is not visible in the drawings. The back panel 332 is provided with three apertures 343A, 343B and 343C, through which the stab jaws 292 of the respective phases are projected and retracted.

Figure 5:
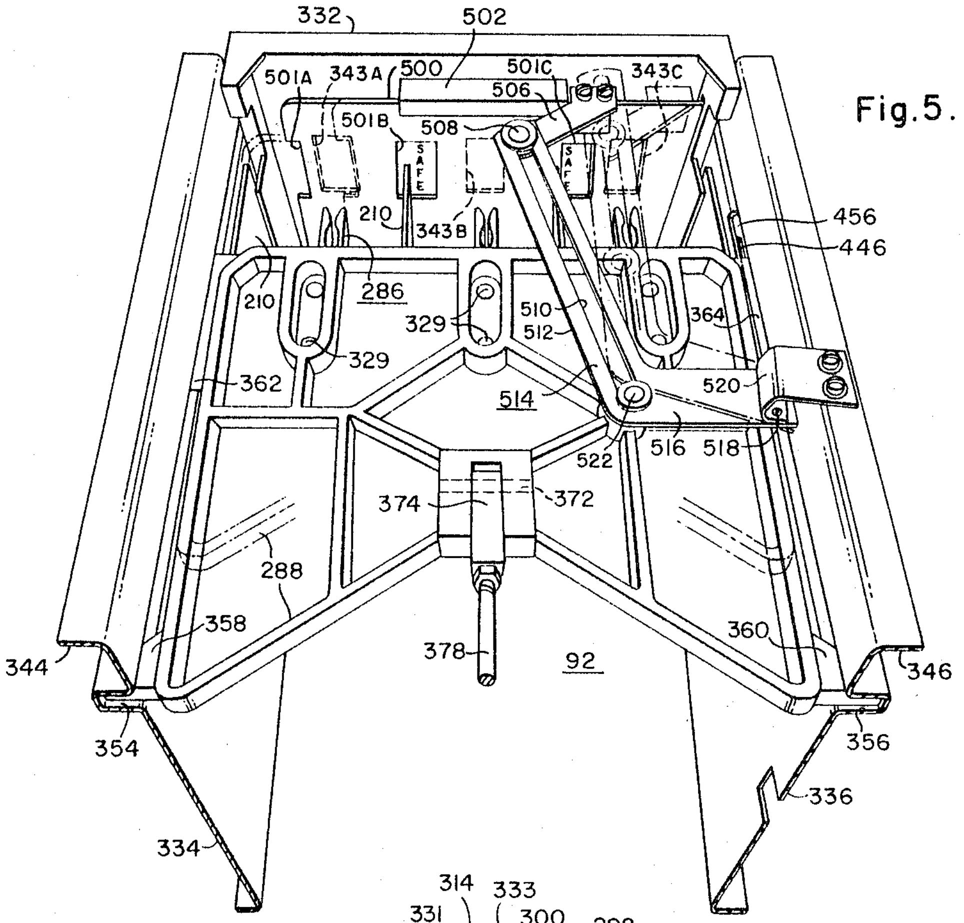
FIG. 5 is a perspective view looking at the fuse clip carrier from the top and illustrating the slidable mounting of the carrier and the cooperative relation between the carrier and a shutter along the back wall which is interposed between the switching apparatus and active line elements in the off position of the apparatus.

Side plates 334 and 336 are provided at their upper edges with outwardly extending flanges 344 and 346 which slidably bear on rails 348 and 350, thereby supporting and allowing slidable movement of the isolating unit into and out of the cabinet. Rail 348 is secured to the left side wall of the cabinet (FIG. 2), while the rail 350 is supported by brackets 352 secured to the top and right sides of the cabinet. The side plates 334 and 336 are provided with inwardly facing channels 354 and 356 which provide guidance and support for the carrier 288 (FIGS. 2 and 5). More specifically, channels 354 and 356 are arranged to receive tabs 358, 360, 362 and 364 which are integral with and laterally extend from the carrier 288. The lower surfaces of channels 354 and 356 act as rails which provide support and slidable movement for the carrier 288.

The operating linkage 290 for reciprocating the carrier 288 from one to the other of its ON and OFF positions, is provided with an adjustable connecting rod 370 having one end pivotally connected at 372 to the carrier 288. The connecting rod 370 includes an internally threaded pivot block 374 pivoted at 372 to the carrier 288, an internally threaded clevis block 376 and an intermediate shank 378 which is threaded at opposite ends and links the two end blocks 374 and 376. One end of the intermediate shank 378 is threaded into and locked with respect to the pivot block 374 while the other end of the shank 378 is threaded into but not locked with respect to the clevis block 376. Thus the clevis block 376 is rotatable around the longitudinal axis of the connecting rod 370 employing the threaded end of the shank portion 378 as a bearing. The clevis block 376 terminates in a clevis 380 pivotally coupled at 382 to an arm 384 of a bell-crank shaped switch handle 386. The latter is rotatable about a pivot 388 fixed relative to a handle housing 390 which is rotatable about an axis generally in line with the longitudinal axis of the connecting rod 370 when the linkage is aligned as in FIG. 3.

In order to allow coupling between the clevis 380 and the bell-crank 386, the front panel 98 is provided with a vertical slot 392 (FIGS. 3, 4, 12) through which the clevis block 376 and the crank arm 384 are passable when moved between the positions shown in FIGS. 3 and 4. Except for a reduced rounded portion 394 the clevis block 376 and the handle 386 each have opposite flat sides and a thickness therebetween which allows movement of these members between the positions shown in FIGS. 3 and 4. However, their rotational movement about the general axis of the connecting rod 370 is blocked by the vertical sides of slot 392 in all positions of the handle 386 around axis 388, except the position shown in FIG. 3 (also FIGS. 12 and 13), wherein the reduced rounded portion 394 of the clevis block 376 is aligned within the slot 392. In the latter position, it is apparent that the clevis block 376 may be rotated and the handle 386 may be rotated around an axis generally parallel to the longitudinal axis of the connecting rod 370.

Since FIG. 3 shows the clip 286 disengaged from the line stab 294, the isolating switch and its operating elements are in the OFF position in this figure. Thus the particular position assumed in FIG. 3 by the fuse receptacle 130, fuse 26, clip 286, carrier 288, clevis block 376, and handle 386, shall be referred to as the OFF position of each of these elements. On the other hand, in FIG. 4 the clip 286 is fully engaged with line stab 294, and the isolating switch and all its operating elements are therefore in the ON position.

Referring now to the OFF position in FIG. 3, the operating handle 386 points downwardly and the reduced section 394 of the clevis block 376 is aligned with the slot 392. In order to operate the isolating unit from the OFF to the ON position, the handle 386 is moved upward and clockwise around the pivot 388 until it assumes the position shown in FIG. 4, that is, its ON position. As the handle 386 is rotated clockwise around pivot 388, its arm 384 moves the clevis block 376 and the carrier 288 from the positions of FIG. 3 to that of FIG. 4. During this movement, carrier 288 moves the clip 286 to the rear and into engagement with line stab 294. During the course of this movement, the upper end of fuse 26 is swung or rocked in a vertical arc around a pivot point approximately at the contact between the lower ferrule 131 and the fuse receptacle 130.

Attached to the isolating unit frame 330 is a "ground" bar 400A which is engaged by a flat contact spring 402A attached to the bracket 328 when the isolating switch is moved from the ON to the OFF position, thus grounding the upper end of fuse 26 for purposes of safety. Also during the movement from ON to OFF position, the upper edge of one fuse jaw engages a guide member 404A fixed relative to the frame 330, thereby to force the fuse jaws down and the stab jaws 292 upward relative to the fuse, thus changing the angle between the axes of the fuse 26 and the clip 286 from substantially 90° to an angle slightly greater than 90°. This action moves the stab jaws 292 to a sufficiently upward position where they may be easily viewed through the open door of the cabinet for visual indication of the open position. Guide 404A also positions clip 286 for fuse insertion.

Attached to the front face of the front panel 98, is a bearing plate 395 which supports the housing 390 for rotation in the directions of the double headed arrow 396 (FIG. 2) around an axis which is normal to panel 98 and generally parallel to the path of movement of the connecting rod 370. Housing 390 comprises a pair of spaced parallel guide walls 398 and 400 (FIGS. 2 and 11) integral with and extending forward from a back portion 402, which is provided with a slot 404 that is aligned with the space between the guide walls. This slot may also be aligned with the slot 392 in the front panel 98 by rotating the housing 390 to that position shown in FIGS. 3, 4, 9, 10, 11 and 12. The axis of the pivot 388 around which the handle 386 is rotatable is crosswise of the rotational axis of the housing 390. Thus the handle 386 is rotatable about two axes, that of pivot 388 and that of the housing 390.

Referring now to FIGS. 11 and 12, the back portion 402 of the housing 390 includes twin arcuate sections 406 and 408 disposed on opposite sides of the slot 404. Sections 406 and 408 have respective rearwardly extending arcuate sections 410 and 411 of lesser radius than the parent sections. Thus there are formed between the reduced sections and the parent sections annular shoulders having flat backwardly directed faces 414 and 416, respectively. The rearwardly extending arcuate sections 410 and 411 are so dimensioned that they are received with a snug but rotatable fit within a generally circular aperture 418 in the bearing plate 395. The upper part of aperture 418 has a slot contour 419 which registers with slot 392 in the front panel 98.

The bearing plate 395 has a circular undercut "channel" 420 extending radially outward from the edge of aperture 418 and dimensioned to provide a snug but rotational fit to a pair of generally arcuate plates 421 and 422 secured respectively to the arcuate extensions 410 and 411 of the housing base 406, thus trapping the undercut lip 423 around the aperture 418. Thus the bearing plate 395 forms a bearing support carrying and permitting rotation of the housing 390. Arcuate plates 421 and 422 are provided with stop tabs 424 and 426 which freely travel the arcuate extent of radially enlarged segments 428 and 430 of the channel 420. The opposite ends of enlarged channel segment 430 and the lower end of enlarged channel segment 428 form abutments to engage the respective stop tabs thereby to limit the rotation of the housing 390 to 90° (FIG. 12). The position of the housing 390 in FIGS. 3, 4, and 9 to 12 is at one limit of the rotation, and the position in FIG. 2 and in dot-dash in FIG. 12 is at the other limit 90° away, counterclockwise.

As seen in FIGS. 11 and 12, the bell-crank arm 384 and the clevis block 376 can pass freely through slot 392, when the housing 390 is in the operative position, i.e., when the housing is aligned with slot 392. However, the dimensions of their rectangular cross sections relative to the slots are such that when the handle 386 is in the ON position (FIGS. 4 and 10), or any position between OFF and ON, the walls of slot 392 prevent the clevis block 376 and the bell crank arm 384 from rotating around an axis normal to the panel 98, and thereby prevent rotation of the housing 390. However, when the handle 386 is in the OFF position, FIGS 3 and 9, the reduced section 394 of clevis block 376 is aligned with slot 392, thereby allowing the linkage and handle 386, together with housing 390 to freely rotate within its permissible 90° arc of travel, for example, to the SAFE position (FIG. 2 and in dot-dash FIG. 12). Another result which follows from this arrangement is that when the housing 390 is in any other position than the operative position (opening 404 of the housing aligned with slot 392 in panel 98), the shoulder 432 between the main body of the clevis block 376 and its reduced portion 394 overlies the edges of slot 392, thereby preventing rearward movement of the clevis block toward the back of the cabinet 90. As a consequence, in the SAFE position (FIG. 2 and dot-dash FIG. 12), or in any position between the OPERATIVE and SAFE positions of the housing 390, the handle 386 cannot be rotated around pivot 388 to move the carrier 288 to the ON position.

Housing 390 is provided with an extending portion 440 which blocks the closed door 100 when the housing 390 is in the OPERATIVE position (FIGS. 3, 4, 9 and 10). Thus the door cannot be opened unless the housing 390 is rotated to the SAFE position (FIG. 2 and dot-dash FIG. 12). It has already been established that the SAFE position can be approached by the housing only when the handle 386 is in the OFF position, in which position the carrier 288 is in the OFF position.

In order to prevent operation of the handle 386 from the OFF to the ON position when the door is open, rotation of the housing 390 from the SAFE to OPERATIVE positions is blocked by a spring loaded pin 442 based in the lower part of panel 98, and extending across the path of movement of the housing 390. When the door is closed, the pin 442 is depressed against its spring by engagement with the inner face of the door. With the door closed, the pin 442 does not impede movement of the housing 390.

From the foregoing description, it should be apparent that the door 100 cannot be opened unless the carrier 288 has been moved to the OFF position, and that the carrier 288 cannot be moved to the ON position unless the door is closed.

The apparatus includes additional and concurrent safety features which lock the carrier 288 in the OFF position when the door 100 is opened, and in the ON position when the contactor armature 222 is attracted to the electromagnet 220 to operate the contactor 20 main contacts. The arrangement for providing these features includes a spring loaded latch 446 (FIGS. 9 and 10) rotatable about a pivot 448 fixed to the side plate 336 of the isolating switch frame 330. The latch 446 has a "detent" 450 which is continuously and resiliently urged upward toward engagement with the carrier 288 by a spring 452. In the OFF position of the carrier (FIG. 9), the detent 450 engages a rearwardly inclined face 454 on the carrier tab 364 through a slot 456 in the channel 356. In the ON position of carrier 288 (FIG. 10), the detent 450 engages a forwardly slanting face 458 on the tab 364 through the slot 456. When the carrier 288 is moved from the ON position to the OFF position, the slanting face 458 cams the detent 450 downward until the OFF position of the carrier is reached, at which time the detent 450 moves into engagement with the rearward face 454. In somewhat the same manner when the movement of the carrier 288 is reversed, the rearward slanting face 454 cams the detent 450 downward, and the detent is held down until the other position is reached.

The latch 446 can be locked in place with the carrier 288 in either the ON or the OFF position by moving the upper end of a pivoted lock bar 460 under a shoe 462 attached to the latch 446. This position of the lock bar 460 is shown in solid in FIG. 10 and in dot-dash in FIG. 9. In this position the latch 446 cannot be cammed downward by the faces 454 and 458, thus preventing movement of the carrier 288. The lock bar 460 is swingable about a pivot 464 fixed to the side wall 336 of the isolating switch frame 330. A spring 466 continuously urges the upper end of the lock bar 460 toward the rear of the cabinet.

The lock bar 460 is movable into the locking position either in response to the opening of door 100 or in response to operation of contactor 20. The arrangement for locking the latch 450 in response to opening of the door includes a draw bar 468 having a slot 470 which cooperates with a pin 472 fixed to the side plate 336 and extending through the slot to allow a combination of reciprocal and rotational movement of the bar 468. The back end of the bar 468 has a hook 474 which is hooked around the back edge of the lock bar 460, so that the lock bar is drawn forward into locking position in response to a forward pull on the draw bar 468.

The forward end of the draw bar 468 is coupled by a pivot 476 to one arm 478 of a bell-crank arrangement 480 which includes another arm 482 that is fixed to rotate with arm 478 around a pivot 484. Bell crank 480 is also provided with an L-shaped operator arm 386 fixed thereto which is one attitude, that shown in FIG. 9, is engageable by the hooked end of a bracket 488 attached to the door 100 (FIG. 9). In the case the door is opened, the bracket 488 draws the forward leg of the L-shaped operator 486 forward to rock the bellcrank 480 counterclockwise, thereby to draw the bar 460 forward to lock the latch 446. In this mode, the positions of the bell-crank 480, draw bar 468, and lock bar 460 are as shown in dot-dash in FIG. 9. Since the door is being opened, the carrier 228, perforce, must be in the OFF position.

Stability in the forward and the relaxed positions of the draw bar 468 is provided by a spring biased toggle arrangement 490 which has two overcenter positions respectively coinciding with the forward and the relaxed positions of the lock bar 468. Included in the toggle arrangement 490, is a longitudinally resiliently compressible lever 492 having one end coupled to the free end of bell-carnk arm 482 at a pivot point 494. The other end of lever 492 is swingable about a pivot pin 496 fixed to the side wall 336 of frame 330. The opposite ends of lever 492 are slidably movable to and away from each other by means of an arrangement wherein one end includes a pin which is received slidably in a cylinder socket in the opposite end of the lever, both ends being resililently urged apart by a spring 497.

As the door is closed, the end of the hook bracket 488 engages the other leg of the L-shaped operator 486 (dot-dash in FIG. 9) to rotate the bell crank 480 clockwise, thereby to relax the bar 468, and allow the lock bar 460 to move back to its non-locking position.

The lock bar 460 is moved to its locking position in response to operation of contactor 20 by means of an arm 498 fixed to the contactor shaft 144 for rotation therewith, and which arm 498 in response to such rotation engages the lower end of lock bar 460 thereby to rotate it counterclockwise into the locking position. The end position of this operation is shown in FIG. 10. This locks the carrier 288 in the ON position whenever the contactor 20 has been operated to close its main contacts.

A further safety feature is provided by a shutter 500 (FIG. 5) which covers the stab apertures 343A, 343B and 343C, in response to movement of the carrier 288 to its OFF position, and uncovers these apertures in response to movement of the carrier 288 to its ON position. These apertures are uncovered when corresponding cut out areas 501A, 501B and 501C of the shutter (FIG. 5) are brought into registry therewith in response to movement of the shutter. The back panel 332 is provided with upper and lower slide ways 502 and 504 (FIGS. 3 and 5) which support and guide the shutter 500 for slidable movement to the right or left as the case may be.

The mechanism for moving the shutter 500 is best seen in FIG. 5. Attached to the top of the shutter is a fixed arm 506 having at the free end thereof a pin 508 which passes through a slot 510 in one arm 512 of a generally L-shaped lever 514 having a second arm 516 at an obtuse angle with the other arm. The end of arm 516 is rotatable about a pivot 518 fixed to a bracket 520 attached to the side frame 336. An upstanding pin 522 fixed to the top of the carrier 288, extends through the slot 510 of lever arm 512. The sides of slot 510 are slidably engaged with pins 508 and 522. In FIG. 5, the carrier 288 is shown in the OFF position, and the stab apertures 343A, 343B and 343C in the back panel 332 are covered by the shutter 500. The word "SAFE" applied to the inner face of the back panel 332 is visible through the shutter apertures 501B and 501C, and may be seen by an operator looking through the door (when opened).

When the carrier 288 is moved from the OFF position to the ON position (shown in dot-dash in FIG. 5), the pin 522 moving rearwardly with the carrier, cams the lever arm 512 to the right to "open" the shutter 500, i.e., move the shutter to the right to bring the shutter apertures into registry with the stab apertures in the back panel 332. It should be noted that less than full movement from the OFF to the ON positions is required to open the shutter. The pin 522 moves the lever arm 512 to the dot-dash position shown in FIG. 5 during a fraction of the initial movement of the carrier 288 from the OFF to the ON position. During the rest of the rearward movement of carrier 288, the pin 522 "idles" through the slot. In response to movement of the carrier 288 from the ON to the OFF position, pin 522 during the first fraction of forward motion of the carrier idles through the slot 510, and during the rest of the forward movement of the carrier engages the forward end of the slot wall 510 and pushes the lever 514 counterclockwise, thereby moving lever arm 512 to the left and "closing" the shutter.

A spring latch 530 (FIG. 9) pivoted around pivot 496 drops into a slot 532, provided in the back end of the upper flanged edge of the contactor unit side plate 108, when the contactor unit 94 is drawn almost all the way out of the cabinet. This feature holds the contactor unit locked in a partially withdrawn position to allow work and inspection therein if desired. To completely remove the contactor unit 94, the latch 530 is lifted manually out of the slot 532.

An alternative arrangement for rockably mounting the lower end of the fuse 26 on a support that also carries the fixed contact 122 of the contactor 20 is shown in FIG. 13. In this figure a conductive tab 282 fixed, for example by brazing, to the lower ferrule 131 of the fuse, is attached by a bolt 283 to a hinge member 284 which is rockable around a pivot 285 that is fixed to a variation of the fuse mount 130 which is supported by the insulating member 134. A flexible conductor 285A is provided for improved electrical connection between the fuse ferrule 131 and the fixed contact 122. For fuse removal, the single bolt 283 is pulled out to separate the fuse from the hinge member 284 on the fuse mount 130. The conductive clip 260 is attached to base 130. Thus, in each of the arrangements shown in FIGS. 3 and 13, the lower end of the fuse is pivotably carried on the fuse mount 130, whereby the upper end of the fuse is pivotable around the lower end of the fuse and is movable forward and backward in a generally arcuate path.

While any suitable insulating material may be employed to fabricate the various parts made of insulation, glass alkyd and glass polyester were found to be particularly advantageous for the dimensions involved. For example, glass polyester was employed for the member 172 and the phase barrier plates 209 and 210, while glass alkyd was used for the members 134, 142, carrier 288, and backwall 332.

For an independent check of the start-stop circuits, an alternative position of switch 52 will connect fuses 54 to to lines 55 which may be connected to a test voltage source (FIG. 1).

In practice the major units of the apparatus may be assembled as follows: First, the isolating switch unit 92 is slipped into the cabinet 90 and secured in place by bolts screwed into metal tabs fixed to the cabinet 90. Then the contactor unit 94, sans fuses, is inserted into the cabinet, after which connections are made at points D, E and F. Next, the fuses 26 may be fitted into place. Then a plug 540 carrying the male elements of the connectors 60 and 66 is fitted into its receptacle to complete the connections at 60 and 66. Conversely, upon removal of the fuses 26, opening the connections at D, E and F, and pulling out the plug 540, the units 94 and 92 may be pulled out in that order for inspection or repair. The auxiliary equipment outside the dashed box 95 (FIG. 1) stays in the cabinet 90.

While not limited thereto, a practical operating example of the disclosed apparatus was constructed for 3-phase operation with a rating of 2500 volts, 180 amperes, 700 horsepower, interrupting capacity 150,000 kva., in a unit 22 inches wide, 33 inches high and 24 inches deep. An additional 6-inch depth was used as a cable pull box. Because of the compact and unique construction, two men were able to handle the subassemblies without need of hoists, cranes, dollies, etc.

From the foregoing description, it is seen that the disclosed apparatus provides novel switching structure having for a given power requirement, minimum size and weight, with improved reliability, safety, and access.

It is to be understood that the herein described arrangements are simply illustrative of the principles of the invention, and that other embodiments and applications are within the spirit and scope of the invention.

I claim as my invention:

1. A switching apparatus assembly comprising first switch means including a set of contact members operable between open and closed positions, a fuse having one end conductively coupled to one of said contact members, means pivotably mounting said one end of the fuse to make the other end of the fuse swingable in opposite directions about said one end, first disconnect contact means coupled to said other end of the fuse and movable therewith, disconnect switch means including said first disconnect contact means and stationary second disconnect contact means in the path of movement of the first disconnect contact means, movable means coupled to said fuse for swinging said other end of the fuse about said one end and selectively moving said first disconnect contact means into contact and out of contact with said second disconnect contact means, and means for operating said set of contact members from the open to the closed position while said fuse is at rest and said first disconnect contact means is in contact with said second disconnect contact means.

2. The combination as in claim 1 wherein said one contact member is stationary, said first switch means is an electromagnetic contactor having an operating coil which is included in said means for operating said set of contact members, and said movable means coupled to said fuse comprises a movable member flexibly coupled to said other end of the fuse, said combination further including a common member on which are mounted said one contact member and at least a portion of said means for pivotably mounting said one end of the fuse.

3. The combination as in claim 1 and further including arc dissipating means for dissipating arcs drawn between said contact members.

4. The combination as in claim 1 wherein said movable means includes a movable member flexibly coupled to said other end of said fuse, said combination further comprising an enclosure in which said set of contact members and said fuse are located, and arc dissipating means located in said enclosure for dissipating arcs drawn between said contact members.

5. The combination as in claim 1 and further comprising arc dissipating means including an arc chute in arc receiving relation to said set of contact members for dissipating arcs drawn between said contact members, said fuse and said set of contact members being disposed along a generally L-shaped pattern, said fuse lying along the leg of the L with said other end of the fuse adjacent the free end of the leg and said one end of the fuse adjacent the foot end of the leg, said set of contact members lying along the foot of the L, and said arc chute lying between the toe of the L and the leg of the L.

6. The combination as in claim 1 wherein said movable means includes a movable member flexibly coupled to said other end of the fuse and which combination further includes arc dissipating means including an arc chute for dissipating arcs drawn between said contact members, said fuse and said set of contact members being disposed along a generally L-shaped pattern, said fuse lying along the leg of the L with said other end of the fuse at the free end of the leg and said one end of the fuse at the junction between the foot and the leg of the L, said set of contact members lying along the foot of the L, and said arc chute lying between the toe of the L and the leg of the L.

7. The combination as in claim 1 wherein said means for operating said set of contact members comprises an electromagnetic operator for operating the set of contact members, and energizing circuit means connected to the electromagnetic operator and to said lower end of said fuse for electrically energizing the electromagnetic operator through said fuse to actuate the electromagnetic operator.

8. The combination as in claim 7 wherein said movable means comprises a movable member flexibly coupled to said other end of the fuse, said combination further including a cabinet in which said set of contact members and said fuse are disposed.

9. The combination as in claim 7 which further comprises arc dissipating means including an arc chute in arc receiving relation to said set of contact members for dissipating arcs drawn between said contact members, said set of contact members and said fuse being disposed along a generally L-shaped pattern, said fuse lying along the leg of the L with said other end of the fuse adjacent the free end of the leg and said one end of the fuse adjacent the foot end of the leg, said set of contact members lying along the foot of the L, and said arc chute being between the toe of the L and the leg of the L.

10. In a switching arrangement, structure means defining an interior space and having opposite reference sides arbitrarily designated front and back to provide a frame of reference so that the direction from said back to the front is the forward direction, switching apparatus disposed in said space and comprising a set of contact members operable between open and closed positions, a generally vertically disposed elongated fuse having its lower end conductively coupled to one of said contact members, means pivotably supporting said fust to make the upper end of the fuse rockable in opposite directions about said lower end, first contact means coupled to and movable with the upper end of the fuse, stationary second contact means in the path of movement of said first contact means, a generally horizontally movable drive means coupled to the upper end of said fuse for rocking the upper end of said fuse about its lower end and selectively moving said first contact means into and out of contact with said second contact means, means for dissipating arcs drawn in said set of contact members, said arc dissipating means including an arc chute disposed in arc receiving relation to said set of contact members and a blowout coil disposed in operative relation to the arc chute for effecting movement of said arcs into the arc chute, said blowout coil being located forward of said set of contact members and of the longitudinal axis of the fuse, said set of contact members being located forward of the longitudinal axis of the fuse, said arc chute being located between said blowout coil and the fuse.

11. In a switching system, structure means defining an interior space and having opposite reference sides arbitrarily designated front and back to provide a frame of reference so that the direction from said back to the front is the forward direction, switching apparatus disposed in said space and comprising a set of contact members operable between open and closed positions, a generally vertically disposed elongated fuse having its lower end conductively coupled to one of said contact members, means pivotally supporting said fuse in such manner that its upper end is rockable about its lower end backward and forward, first contact means coupled to and movable with the upper end of the fuse, stationary second contact means in the path of movement of said first contact means movable drive means coupled to the upper end of said fuse and operable from outside said structure means for rocking said fuse about its lower end and selectively moving said first contact means into and out of contact with said second contact means, means for dissipating arcs drawn in said set of contact members, said arc dissipating means including an arc chute disposed in arc receiving relation to said set of contact members and a blowout coil disposed in operative relation to the arc chute for effecting movement of said arcs into the arc chute, said blowout coil being located forward of said set of contact members and of the longitudinal axis of the fuse, said set of contacts being located forward of the longitudinal axis of the fuse, said arc chute being located between said blowout coil and the fuse, and a current transformer located below said blowout coil and said set of contact members, said current transformer being connected to said blowout coil.

12. Switching apparatus comprising a set of contact members operable between open and closed positions, an elongate fuse having one end conductively coupled to one of said contact members, means pivotably supporting said fuse to make its other end swingable in opposite directions about said one end, first contact means coupled to and movable with said other end of the fuse, stationary second contact means in the path of movement of said first contact means, movable drive means coupled to said fuse for swinging said fuse about said one end and selectively moving said first contact means into and out of contact with said second contact means, means for dissipating arcs drawn in said set of contact members, said arc dissipating means including an arc chute disposed in arc receiving relation to said set of contact members and a blowout coil disposed in operative relation to the arc chute for effecting movement of said arcs into the arc chute, said fuse, said set of contact members, and the blowout coil being disposed along an L-shaped pattern wherein the fuse lengthwise lies along the leg of the L with said other end of the fuse at the free end of the leg, the blowout coil lies at the toe of the L, and the set of contact members lies along the foot of the L and back of the toe, said arc chute being in the space between the leg and toe of the L.

13. Switching apparatus comprising a set of contact members operable between open and closed positions and including a stationary contact member and a power-operated movable member, an elongate fuse having one end conductively coupled to said stationary contact member, a common support which supports said stationary contact member and also pivotably supports said one end of the fuse to make its other end swingable about said one end in opposite directions, a first contact element coupled to and movable with said other end of the fuse, a stationary second contact element in the path of movement of said first contact element, a movable drive means coupled to said fuse for swinging said fuse about said one end and selectively moving said first contact element into and out of contact with said second contact element, means for dissipating arcs drawn in said set of contact members, said arc dissipating means including an arc chute disposed in arc receiving relation to said set of contact members and a blowout coil disposed in operative relation to the arc chute for effecting movement of said arcs into the arc chute, said fuse, said set of contact members, and the blowout coil being disposed along an L-shaped pattern wherein the fuse lies lengthwise along the leg of the L with said other end of the fuse at the free end of the leg, the blowout coil lies at the toe of the L, and the set of contact members lies along the foot of the L and back of the toe, said arc chute being in the space between the leg and toe of the L.

14. In a switching system, structure means defining an interior space and having a reference side with an opening and a movable door having closed and open positions for respectively covering and uncovering said opening, switching apparatus disposed in said space and comprising a set of contact members operable between open and closed positions and including a stationary contact member, a generally vertically disposed elongated fuse having its lower end conductively coupled to said stationary contact member, a common support which supports said stationary contact member and also pivotably supports the lower end of the fuse in such manner that the upper end of the fuse is rockable in opposite directions about said lower end, first contact means coupled to and movable with the upper end of the fuse, stationary second contact means in the path of movement of said first contact means, movable drive means coupled to said fuse and operable from outside said structure means for rocking said fuse about its lower end and selectively moving said first contact means into and out of contact with said second contact means, means for dissipating arcs drawn in said set of contact members, said arc dissipating means including an arc chute disposed in arc receiving relation to said set of contact members and a blowout coil disposed in operative relation to the arc chute for effecting movement of said arcs into the arc chute, said fuse, said set of contact members, and the blowout coil being disposed along an L-shaped pattern whose toe points generally toward said reference side and wherein the fuse lies lengthwise along the leg of the L with the upper end of the fuse at the free end of the leg, the blowout coil lies at the toe of the L, and the set of contact members lies along the foot of the L and back of the toe, said arc chute being in the space between the leg and toe of the L.

15. In a switching system, structural means defining an interior space and having a reference side with an opening and a movable door having closed and open positions for respectively covering and uncovering said opening, switching apparatus disposed in said space and comprising a power-operated switch having a set of contact members operable between open and closed positions, a generally vertically disposed elongated fuse having its lower end conductively coupled to one of said contact members, means pivotably supporting the lower end of said fuse to make the upper end of the fuse swingable about the lower end in opposite directions, a first contact element coupled to and movable with the upper end of the fuse, a stationary second contact element in the path of movement of said first contact element, a generally horizontally movable drive means coupled to the upper end of said fuse and operable from outside said structural means for swinging said fuse about its lower end and selectively moving said first contact element into and out of contact with said second contact element, means for dissipating arcs drawn in said set of contact members, said arc dissipating means including an arc chute disposed in arc receiving relation to said set of contact members and a blowout coil disposed in operative relation to the arc chute for effecting movement of said arcs into the arc chute, said fuse, said set of contact members, and the blowout coil being disposed along an L-shaped pattern whose toe points generally toward said reference side and wherein the fuse lies lengthwise along the leg of the L, with the upper end of the fuse at the free end of the leg and the lower end of the fuse at the foot end of the leg, the blowout coil lies at the toe of the L, and the set of contact members lies along the foot of the L and back of the toe, said arc chute being in the space between the leg and toe of the L.

16. In a switching arrangement, a set of contact members operable between open and closed positions, a common support member, said set of contact members including a stationary contact member carried by said common support member, a fuse having one end conductively coupled to said stationary contact member, said one end of said fuse being pivotably mounted on said common support to make the other end of the fuse swingable around said one end in opposite directions in a predetermined path, a stationary contact element, means coupled to said fuse for rocking the fuse and moving the other end of the fuse into and out of electrical contact with said contact element, means for dissipating arcs produced in said set of contact members, said arc dissipating means including an arc chute disposed in arc receiving relation to said set of contact members and a blowout coil disposed in operative relation to the arc chute for effecting movement of said arcs into the arc chute, one end of said blowout coil being connected to another of said contact members, said blowout coil being located away from said fuse and said set of contact members in the same general direction, said arc chute being located between said fuse and said blowout coil, said arc chute having an exhaust outlet directed away from said path.

17. Switching apparatus comprising a power operated switch having a set of contact members operable between open and closed positions, a common support member, said set of contact members including a stationary contact member carried by said common support member, a generally vertically disposed fuse having its lower end conductively coupled to said stationary contact member, the lower end of said fuse being rockably mounted on said common support to make the upper end of the fuse pivotable about said lower end in opposite directions in a predetermined path, a stationary contact element, means coupled to said fuse for rocking the fuse and moving the upper end of the fuse into and out of electrical contact with said contact element, means for dissipating arcs produced in said set of contact members, said arc dissipating means including an arc chute disposed in arc receiving relation to said set of contact members and a blowout coil disposed in operative relation to the arc chute for effecting movement of said arcs into the arc chute, one end of said blowout coil being connected to another of said contact members, said blowout coil being located away from said fuse and said set of contact members in the same general direction, said arc chute being located between said fuse and said blowout coil, said arc chute having an exhaust outlet directed away from said path, and a current transformer connected to the other end of said blowout coil and located adjacent to and below said blowout coil and said set of contact members.

18. In a switching arrangement, structure means defining an interior space, said structure means having a reference side and a side opposite thereto, switching apparatus within said interior space comprising a power-operated switch having a set of contact members operable between open and closed positions, a fuse having one end conductively coupled to one of said contact members, means pivotably mounting said one end of the fuse to make the other end of the fuse swingable in opposite directions about said one end in a predetermined path generally toward and from said opposite side, a stationary contact element, a driving mechanism coupled to said fuse and operable from outside said structure means for swinging the fuse and selectively moving said other end of the fuse into and out of electrical contact with said contact element, means for dissipating arcs produced in said set of contact members, said arc dissipating means including an arc chute disposed in arc receiving relation to said set of contact members and a blowout coil disposed in operative relation to the arc chute for effecting movement of said arcs into the arc chute, said blowout coil being located away from said fuse and said set of contact members in a direction toward said reference side, said arc chute being located between said fuse and said blowout coil.

19. In a switching arrangement, structure means defining an interior space, said structure means having a reference side and a side opposite thereto, switching apparatus within said interior space comprising a set of contact members operable between open and closed positions, a fuse having one end conductively coupled to one of said contact members, contact means coupled to the other end of the fuse and movable therewith, means rockably mounting said one end of the fuse to make the other end of the fuse swingable about said one end in opposite directions in a predetermined path generally toward and from said opposite side, a stationary contact element disposed on the line of movement of said contact means, fourth means coupled to said fuse for swinging the fuse and selectively moving said contact means into and out of electrical contact with said contact element, said fourth means having operating means extending exteriorly of said structure means whereby said fourth means is operable from outside said structure means, means for dissipating arcs produced in said set of contact members, said arc dissipating means including an arc chute disposed in arc receiving relation to said set of contact members and a blowout coil disposed in operative relation to the arc chute for effecting movement of said arcs into the arc chute, one end of said blowout coil being connected to another of said contact members, said blowout coil being located away from said fuse and said set of contact members in a direction toward said reference side, said arc chute being located between said fuse and said blowout coil.

20. In a switching arrangement, structure means defining an interior space, said structure means having a reference side and a side opposite to the reference side, switching apparatus within said interior space comprising a set of contact members operable between open and closed positions, a common support member, said set of contact members including a stationary contact member carried by said common support member, a fuse having one end conductively coupled to said stationary contact member, said one end of the fuse being rockably mounted on said common support to make the other end of the fuse swingable in opposite directions in a predetermined path generally toward and from said opposite side, a stationary contact element located to face that side of the fuse which faces said opposite side of the structure means, means coupled to said fuse and operable from outside said structure means for swinging the fuse and selectively moving said other end of the fuse into and out of electrical contact with said contact element, means for dissipating arcs produced in said set of contact members, said arc dissipating means including an arc chute disposed in arc receiving relation to said set of contact members and a blowout coil disposed in operative relation to the arc chute for effecting movement of said arcs into the arc chute, one end of said blowout coil being connected to another of said contact members, said blowout coil being located away from said fuse and said set of contact members in a direction toward said reference side, said arc chute being located between said fuse and said blowout coil.

21. In a switching arrangement, structure means defining an interior space, said structure means having a reference side with an opening, said structure means having a side opposite to said reference side, switching apparatus within said interior space comprising a set of contact members operable between open and closed positions, a generally vertically disposed fuse having its lower end conductively coupled to one of said contact members, said fuse having contact means at the upper end thereof, means rockably mounting the lower end of the fuse to make the upper end of the fuse swingable in opposite directions about the lower end of the fuse in a predetermined path generally toward and from said opposite side, a stationary contact element disposed along the line of movement of said contact means, fourth means coupled to said fuse for swinging the fuse and moving said contact means into and out of electrical contact with said contact element, said fourth means having operating means extending exteriorly of said structure means whereby said fourth means is operable from outside said structure means, means for dissipating arcs produced in said set of contact members, said arc dissipating means including an arc chute disposed in arc receiving relation to said set of contact members and a blowout coil disposed in operative relation to the arc chute for effecting movement of said arcs into the arc chute, one end of said blowout coil being connected to another of said contact members, said blowout coil being located away from said fuse and said set of contact members in a direction toward said reference side, said arc chute being located between said fuse and said blowout coil, said arc chute having an exhaust outlet directed toward said opening and away from said path, and a current transformer connected to the other end of said blowout coil and located adjacent to and below said blowout coil and said set of contact members.

22. In a switching arrangement, structure means defining an interior space, said structure means having a reference side and a side opposite thereto, said reference side having an opening, switching apparatus within said interior space comprising a power-operated contactor having a set of contact members operable between open and closed positions, a common support member, said set of contact members including a stationary contact member carried by said common support member, a generally vertically disposed fuse having its lower end conductively coupled to said stationary contact member, a first contact element coupled to the upper end of said fuse and movable therewith, the lower end of the fuse being rockably mounted on said common support to make the upper end of the fuse swingable about said lower end in opposite directions in a generally arcuate course generally toward and from said opposite side, a stationary second contact element disposed along the path of movement of said first contact element, means coupled to said fuse and operable from outside said structure means for swinging the fuse and selectively moving said first contact element into and out of electrical contact with said second contact element, means for dissipating arcs produced in said set of contact members, said arc dissipating means including an arc chute disposed in arc receiving relation to said set of contact members and a blowout coil disposed in operative relation to the arc chute for effecting movement of said arcs into the arc chute, one end of said blowout coil being connected to another of said contact members, said blowout coil being located away from said fuse and said set of contact members in a direction toward said reference side, said arc chute being located between said fuse and said blowout coil, said arc chute having an exhaust outlet directed toward said opening and away from said path, and a current transformer connected to the other end of said blowout coil and located adjacent to and below said blowout coil and said set of contact members.

References Cited by the Examiner

UNITED STATES PATENTS

| | | | |
|---|---|---|---|
| 1,511,408 | 10/1924 | Kries | 200—114 X |
| 2,004,328 | 6/1935 | Johansson | 200—113.3 |
| 2,186,640 | 1/1940 | Jirka et al. | 200—162 X |

References Cited by the Applicant

UNITED STATES PATENTS

| | | |
|---|---|---|
| 1,253,659 | 1/1918 | Aalborg. |
| 2,629,795 | 2/1953 | Hanks. |
| 2,636,954 | 4/1953 | Hellstern. |
| 2,792,472 | 5/1957 | Koch. |
| 2,938,093 | 5/1960 | McCloud. |

FOREIGN PATENTS

| | | |
|---|---|---|
| 303,951 | 1/1929 | Great Britain. |
| 375,163 | 6/1932 | Great Britain. |

BERNARD A. GILHEANY, *Primary Examiner.*

ROBERT K. SCHAEFER, *Examiner.*

H. A. LEWITTER, *Assistant Examiner.*